Aug. 12, 1941.　　　　G. BARTH　　　　2,252,059
METHOD AND A DEVICE FOR DETERMINING THE MAGNITUDES OF MAGNETIC FIELDS
Filed Dec. 24, 1937　　　2 Sheets-Sheet 1
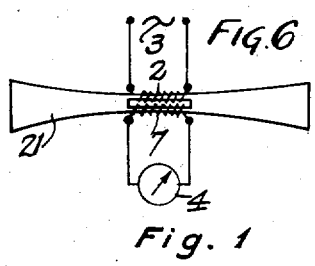
Fig. 1
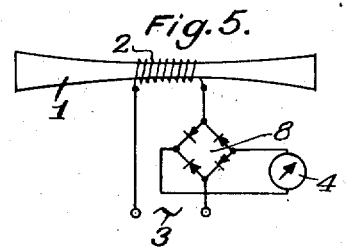
Fig. 5.
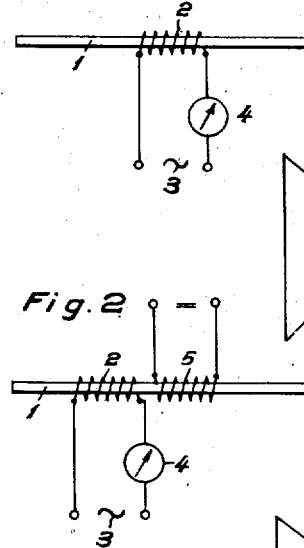
Fig. 2
Fig. 3
Fig. 4.
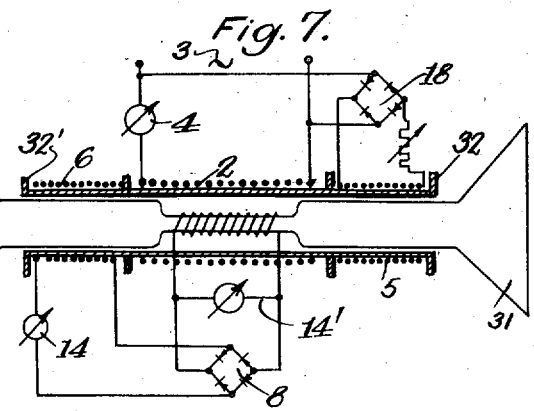
Fig. 6
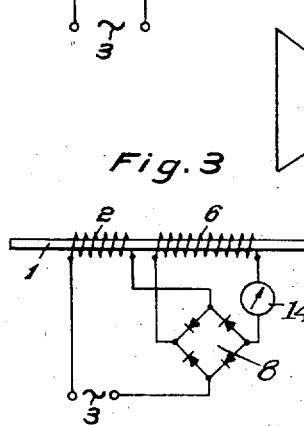
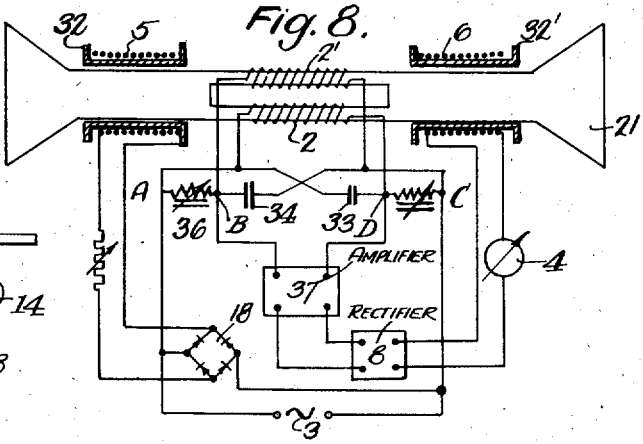
Fig. 7.
Fig. 8.
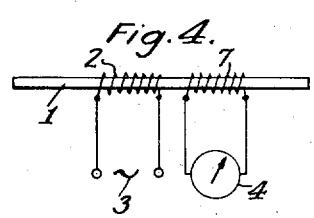
Inventor
Gustav Barth
by Knight Bros
Attorneys

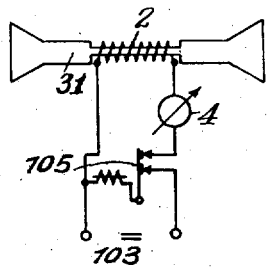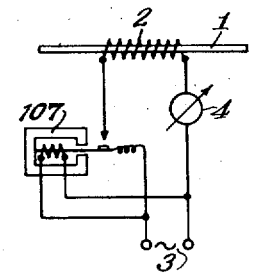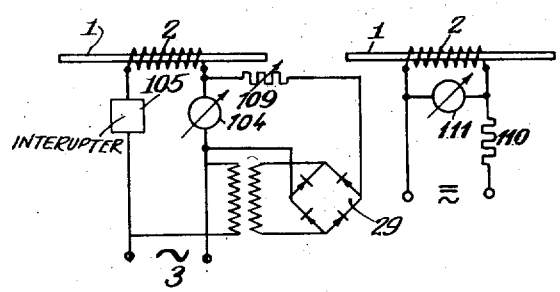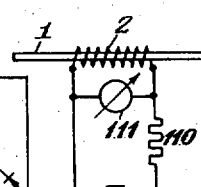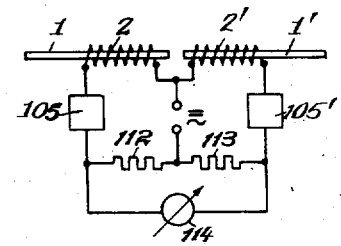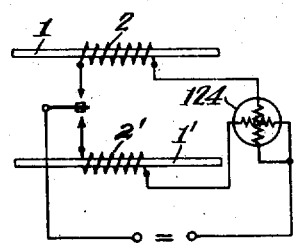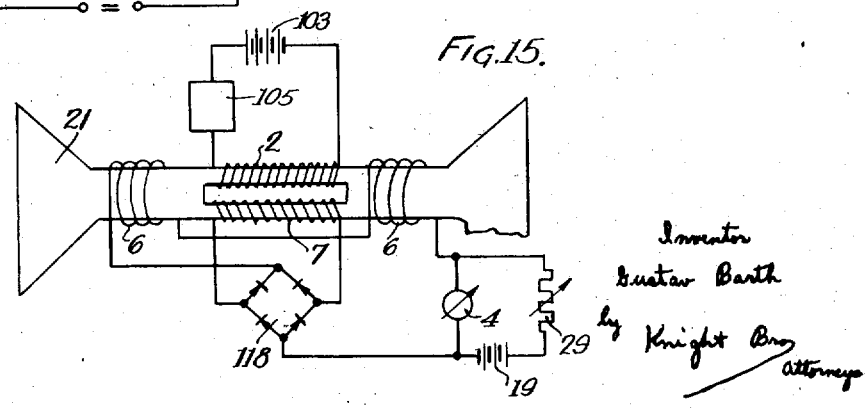

Patented Aug. 12, 1941

2,252,059

UNITED STATES PATENT OFFICE 2,252,059

METHOD AND A DEVICE FOR DETERMINING THE MAGNITUDES OF MAGNETIC FIELDS

Gustav Barth, Berlin, Germany, assignor to Siemens Apparate und Maschinen Gesellschaft mit beschrankter Haftung, Berlin, Germany, a corporation of Germany Application December 24, 1937, Serial No. 181,719
In Germany December 24, 1936

11 Claims. (Cl. 175—183)

The present invention relates to a method and a device for determining the magnitudes of a magnetic field.

To determine the magnitudes of a magnetic field, for instance, of the magnetic earth's field it is well known in the art to employ a magnetic body, such as a magnetic needle, by means of which both the direction and the intensity of the field may be determined.

Furthermore, this determination may be effected with the aid of a coil in which, when moved in the magnetic field, an electromotive force is produced from which the magnitudes of the field to be measured may be determined.

According to the present invention the magnitudes of a magnetic field are determined by the fact that the desired magnitudes are derived with the aid of a magnetically highly permeable body and of windings allotted to the magnetic body, from the reciprocal effect produced on the one hand by a periodically variable magnetic flux produced in this body by a periodically variable electric current, for instance, with the aid of one of said windings, and on the other hand by the constant flux produced by the magnetic field to be measured.

Another feature of the invention consists in deriving the desired magnitudes from the resistance—depending upon the aforementioned reciprocal effect for the periodically variable electric current of one or more of said windings.

A further feature of the invention consists in deriving the desired magnitudes from the electromotive forces—depending upon the reciprocal effect—of one or more of said windings.

Further details of the invention will be apparent from the following description taken in connection with the accompanying drawings in which Figs. 1 through 8 show in diagrammatic form different embodiments in which a magnetic body of high permeability is magnetized by means of an alternating current;

Figs. 9 through 15 show embodiments in which the magnetizing current is a direct current of varying intensity or a direct current in superposition with an alternating current.

In the different figures the same reference numerals are employed for equal or equivalent elements in order to facilitate a comparison.

In Fig. 1, I denotes a magnetically highly permeable body, for instance of permalloy, having a rod shape, the longitudinal dimension thereof being preferably very great in proportion to the transverse dimension. Preferably on the central portion of this body is arranged a winding 2 supplied with an alternating current by a power source 3.

The alternating current flowing in the arrangement is indicated by the indicating instrument 4 and produces with the aid of the winding 2 in the body 1 an alternating flux of the same frequency. If the arrangement is brought into a magnetic field, for instance, of constant field strength, this field produces a magnetic constant flux in the body 1 with the result that the impedance of the winding 2 and therefore the strength of the alternating current through this winding are varied. This variation of the intensity of current is indicated by the instrument 4. This indication gives a direct measure for the magnitude of the component of this field falling in the direction of the axis of the body.

In Fig. 2 another winding 5, energized by a direct-current source is allotted to the magnetically highly permeable body 1. By means of this winding an additional magnetization hereinafter referred to as a magnetic bias is produced in the body 1. By the selection of the intensity of current, this magnetic bias and therefore the working point on the magnetization curve may be chosen at will and so adjusted that it lies in the portion of the curve most suitable for the present purposes.

The magnetic bias presents the further advantage that also the sense of direction of the magnetic field may be determined inasmuch as this field acts either in the sense of the magnetic bias or in the opposite sense.

If according to Fig. 3 a rectifier 8 is inserted in the alternating-current circuit a portion of this rectified current may be employed to bring about in another winding 6 another additional magnetic bias effective either in the sense of the field to be measured or in the opposite sense, the magnetic bias varying the effect of the field to be determined, thus making possible an amplification of the effect of the field to be measured when determining the latter.

In the arrangement shown in Fig. 4 is arranged on the body 1 a second winding 7 in which the magnetic alternating flux, produced in the body 1 by the alternating current in the winding 2 induces an electromotive force whose magnitude depends upon the magnetic constant flux of the field to be determined in the body 1. This E. M. F. may therefore be utilized as a measure for determining the magnetic field. Also in this case as in the form of the invention shown in Fig. 2 the selection of the working point may be effected at will with the aid of an additional magnetic bias. A portion of the rectified secondary current may also be employed to produce in an additional winding an auxiliary magnetic field which influences the effect of the field to be determined in the manner as above described, thus enhancing at will the sensitiveness of the arrangement.

As above mentioned favorable conditions are attained if the ratio of the dimensions of the body 1 is properly chosen. The favorable effect may be still enhanced if the portion of the body 1 which carries the winding 2 is flared so as to have a smaller cross section at the portion carrying the magnetizing winding than at the other portions, particularly at the ends of the body. By a corresponding selection of the flaring cross-section the ratio of the longitudinal dimension to the transverse dimensions may be varied within wide limits so as to attain favorable dimensions of the body 1. A particularly advantageous shape of the body 1 is, for instance, shown in Fig. 5.

Another shape of the body is shown in Fig. 6. In this form of the invention a double tapering section is shown. On each of the tapering sections is arranged a winding which form the primary and the secondary winding of a transformer arrangement.

Fig. 6 shows only an example for arranging the two windings. However, it is evident that both windings may also be arranged on the body 1 in another manner. Thus, for instance, the primary winding might be arranged on any portion of the body 1 other than on one of the tapering portions; the secondary winding might be arranged in this case on one or on both of the tapering portions.

In the embodiments shown, so far both windings are arranged side by side. They may, of course be also arranged one above the other. Another possibility of arranging the windings would consist in placing the windings not directly on the body 1 but on special winding supports. Thus, for instance, the winding, particularly that for the magnetic bias or one of the transformer windings might be arranged on a tubular winding support enclosing the body 1. An embodiment representing these modifications is shown in Fig. 7.

In Fig. 7 the ferromagnetic body 31 has a constricted center portion carrying the secondary winding 7, two adjoining portions of larger cross section carrying windings 5 and 6, the ends of the body being flared. This shape when properly dimensioning the constricted cross section, has the advantage that the ratio of the longitudinal dimension to the transverse dimension may be kept smaller than with bodies of other shapes. The primary winding 2 surrounds the secondary and is connected to an alternating current source 3 through instrument 4 in the same way as shown in Figs. 1 through 6. Winding 5 serves to bias the magnetic body (corresponding to winding 5 in Fig. 2). The direct current for energizing winding 5 is derived from source 3 by means of a rectifier 18, although a separate direct current source may be used instead, as shown in Fig. 2. Winding 6 serves for producing an amplification of the effect to be measured, as explained above in connection with the equivalent winding in Fig. 3, and is connected with current source 3 by an amplifier 8 through indicating instruments 14 and 14'. The two windings 5 and 6 are placed on tubular supports 32 and 32' respectively.

The function of the arrangement is in principle the same as that of the arrangement shown in Fig. 3. The magnetizing effect of the magnet field to be measured on the magnetic body 31 is amplified by the action of winding 6, and is manifested by its influence on the effective impedance of coil 2 measured by instrument 4, the working point of the magnetization curve being adjustable by varying the bias produced by winding 5.

The alternating-current windings, for instance, the winding 2 in Figs. 1 through 7 may also form portions of oscillation circuits. Thus, a condenser might be connected in parallel relation to the winding 2 as, for instance, indicated in Fig. 7 by 33. By the magnetic field to be determined the constants of the oscillation circuit comprising winding 2 and condenser 33 are varied. These constants may therefore be used as a measure for the determination of the magnetic field.

The alternating-current windings may represent branches of a bridge connection whose other branches may, for instance, consist of ohmic resistances or reactors and the like. The variation in resistance of such an arrangement may, for instance, be utilized in this case to determine the magnetic field. However, two or more branches, under circumstances, all branches of the bridge connection may each be formed of such an arrangement or of portions of such an arrangement. This applies also to arrangements having the above-mentioned oscillation circuits. An embodiment of this type is illustrated in Fig. 8.

Fig. 8 shows a bridge arrangement employing oscillatory circuits. The magnetic body 21, shaped according to Fig. 6, has two parallel constrictions each carrying a winding 2 and 2' respectively. The two windings are connected with the alternating current source 3 through condensers 33 and 34 and resistances 35 and 36 so as to form a bridge arrangement, the points A and C of the arrangement being connected with the current source and the points B and D representing the terminals of the zero branch or diagonal of the bridge. The two oscillatory circuits, thus formed of the alternating current windings and the condensers, constitute two opposite branches of the bridge arrangement. The diagonal BD of the bridge is connected to the input circuit of an amplifier 37. The winding 5 serves for producing a constant magnetic bias of the body and is connected with a rectifier 18 fed by current source 3. The winding 6 is connected to a rectifier 8 fed from the output circuit of amplifier 37.

If after proper adjustment of the bias effected by winding 5, for instance so that instrument 4 is in zero position, the body 21 is exposed to the magnet field to be tested, the bridge balance is disturbed and the diagonal current causes the amplifier 37 to energize coil 6. Since this coil reacts on body 21, an electromagnetic feed-back is produced which results in enhancing the effect to be measured. Instrument 4 now shows a deflection corresponding to that effect.

Instead of magnetizing the magnetic body by means of alternating current, direct current of varying intensity or an alternating current superposed on direct current may be used. Some modifications of this type are described in the following.

Fig. 9 shows an arrangement similar to that of Fig. 1 except that a magnetic body 31 shaped according to that of Fig. 7, and a direct current source 103 is used in combination with means 105 for varying the current intensity, such as a mechanical interrupter, buzzer or the like.

In an arrangement of this type, it is easily possible to locate the working point of the magnetization curve of body 31 so as to lie in a favorable portion of the curve by selecting the intensity of the direct current. In this manner a particularly simple arrangement is attained, since further provisions for the choice of the working point on the magnetization curve are not necessary. A further advantage lies in the fact that the sense of direction of the field to be measured may be easily obtained from the indication of the instrument, since this field strengthens or weakens the field produced by the periodically variable direct current in the body 31.

The periodically varying direct-current may be derived also from alternating current. This is shown in Fig. 10. 107 is a mechanical rectifier which works as a one-way rectifier and is connected to the alternating-current source 3. Instead of this mechanical rectifier also other rectifiers may be advantageously employed, particularly rectifiers without mechanically moved parts; for instance, vacuum tube rectifiers, dry rectifiers, such as copper oxide and selenium rectifiers and the like.

The sensitiveness of the measuring arrangements may be increased at will by the use of a sensitive indicating instrument. Such instruments, however, require that the circulating current flowing, while the magnetic field to be measured has the zero value, is prevented from acting on the sensitive instrument.

In Fig. 11 is shown a form of the invention for a circuit in which the circulating current in the indicating instrument is completely or partially compensated or under certain circumstances overcompensated. The compensating current may be taken from a separate direct-current source or from an alternating-current source cooperating with a rectifier. By correspondingly designing the arrangement the compensating current may be also taken from the same direct- or alternating-current source serving to energize the winding 2. In Fig. 11, for instance, a measuring network of a type similar to that of Fig. 9 is shown, in which a sensitive instrument 14 is connected with a compensating circuit which includes a variable resistor 29 and is fed from a rectifier 28 connected with the alternating current source 3 through a transformer 38.

The above-mentioned changes in resistance of the winding 2 caused by the magnetic field to be measured may also be determined by measuring the change in voltage caused by the change in resistance. Fig. 12 exemplifies a network for such a voltage determination. 110 denotes a constant resistance and 111 an instrument serving to indicate the voltage across the winding 2. Since the voltage is proportional to the resistance of the winding it constitutes a measure for the magnitudes of the magnetic field to be determined. This arrangement is somewhat similar to that of Fig. 4 and may be modified correspondingly so as to have the voltage-measuring instrument connected with a separate winding disposed on the magnetic body. An example showing these features in combination with other particularities is shown in Fig. 15 and will be explained in a later paragraph.

Another way of indicating the change in resistance is to arrange the winding 2 so as to form a branch of a bridge connection. The other branches of the bridge connection may, for instance, be formed by ohmic resistances or reactors or the like. However, also two or more branches, under circumstances all branches of the bridge connection may be formed by such windings. In Fig. 13 is shown, for instance, a bridge connection in which two branches are formed by the windings 2 and 2' arranged on the magnetically highly permeable bodies 1 and 1', whereas in the other two branches lie ohmic resistances 112, 113 which, of course, may be variable. As a power source a direct-current or an alternating-current source may be employed, the numerals 105 and 105' denoting devices for producing the periodical variations of the direct current. Instead of the two separate devices also a single device common to both windings 2 and 2' may be provided. Both windings 2 and 2' further may be arranged on a common magnetic body instead on separate bodies. 114 denotes the bridge indicating instrument which, for instance, may be an ammeter or voltmeter, a part of an amplifying arrangement, a relay or the like.

This bridge connection presents a considerable advantage insofar as by the symmetrical design, changes in voltage of the power source, changes in cycle of the periodically variable direct current employed, changes in temperature, etc., do not interfere with the bridge indicating instrument as to its zero position.

A further embodiment is shown in Fig. 14. 118 denotes an indicating instrument which has at least two windings which are traversed by the currents of the windings 2 and 2' in such a manner that, for instance, in the case of an equal intensity of the currents their effects on the indicating system of the instrument 118 are neutralized. For instance, a differential galvanometer, a rotary magnet or the like may be employed as an indicating instrument.

In the embodiment shown in Fig. 15, a magnetically high permeable body 21 is provided with two windings 2 and 7 similar to Fig. 4, so as to represent a transformer. Winding 2 is connected with a direct current source 103 through a device 105 for varying the current intensity. Winding 7 is connected with a direct current instrument 4 through a rectifier 118. The voltage indicated by instrument 4 depends upon the magnetization of body 61 and is a measure for the magnitude to be determined.

In arrangements of the type exemplified by Fig. 15, the rectified current or a portion thereof may, furthermore, serve to bring about an additional magnetic bias in a winding 6 arranged on the magnetic body 21. In this manner it is possible to vary, for instance, to amplify the action of the magnetic field to be determined, since this current produces an additional constant flux which is superimposed upon the magnetic flux of the field to be measured.

The secondary winding 7 may form, in a similar manner as the windings 2 in the above-described embodiments, a branch of a bridge connection. Furthermore, it is possible to form by means of such secondary windings a plurality, under circumstances, all branches of the bridge connection. In a like manner compensating circuits of the above-described character may be employed for the secondary windings, for instance such as the compensating circuit 19, 29 shown in Fig. 15 similarly to that of Fig. 11. The secondary windings, further, may form part of oscillation circuits. In other words, the modifications illustrated, for instance in Figs. 7, 8 or 13, with relation to windings 2 and 2' may also be employed in connection with the secondary windings 7 and 7' of arrangements of the transformer type.

I claim:

1. The method of determining the magnitudes of a unidirectional magnetic field, for instance the magnetic earth field, which includes producing in an elongated body of high permeability a periodically variable magnetic flux and a superposed constant flux of adjustable magnitude for selecting the effective working range of the magnetization curve of said body, exposing said body to the field to be tested so as to produce another constant flux in said body depending upon the magnitude to be determined, and determining a magnitude depending upon the reciprocal effect of said latter flux and said variable flux on the magnetization of said body.

2. The method of determining the magnitudes of a unidirectional magnetic field, for instance the magnetic earth field, which includes producing in an elongated body of high permeability a periodically variable magnetic flux, exposing said body to the field to be tested so as to superpose a constant magnetic flux in said body depending upon the magnitude to be determined, determining the variation of an electric magnitude caused by said fluxes in an electric circuit associated with said body, and causing said body to be additionally magnetized in response to said variations so as to thereby amplify the effect of said magnitude to be determined.

3. The method of determining the magnitudes of a unidirectional magnetic field, for instance the magnetic earth field, which includes producing in an elongated body of high permeability a periodically variable magnetic flux, exposing said body to the field to be tested so as to superpose a constant magnetic flux in said body depending upon the magnitude to be determined, producing an additional variable magnetization in said body in response to a variation caused by the interaction of said fluxes in an electric circuit magnetically coupled with said body whereby the effect of said magnitude on said body is amplified, and determining said amplified effect.

4. An arrangement for determining the magnitudes of a magnetic field, comprising a body of magnetically highly permeable material to be exposed to said field, a winding arranged on said body and designed for producing a periodically variable magnetization in said body, a circuit connected with said winding for supplying said winding with a current of periodically variable intensity, a second magnetizing winding arranged on said body, a rectifier having its input terminals connected in said circuit and its output terminals connected with said second winding so as to energize said second winding by a direct current varying in intensity in accordance with the effect of said field on the magnetization of said body, and a direct current measuring instrument connected with said second winding for indicating said effect.

5. An arrangement for determining the magnitudes of a magnetic field, comprising a body of magnetically highly permeable material to be exposed to said field, a winding arranged on said body and designed for producing a periodically variable magnetization in said body, an alternating current circuit connected with said winding, a second magnetizing winding arranged on said body, a rectifier having its input terminals connected in said circuit and its output terminals connected with said second winding so as to energize said second winding by a direct current varying in intensity in accordance with the effect of said field on the magnetization of said body, a third winding arranged on said body, a regulatable direct current circuit connected with said third winding for adjusting the working range of the magnetization curve of said body, and a measuring instrument associated with said arrangement so as to be actuated in accordance with said effect.

6. An arrangement for determining the magnitudes of a magnetic field, comprising a body of magnetically highly permeable material to be exposed to said field, a winding arranged on said body and designed for producing a periodically variable magnetization in said body, an alternating current circuit connected with said winding, a second magnetizing winding arranged on said body, a rectifier having its input terminals connected in said circuit and its output terminals connected with said second winding so as to energize said second winding by a direct current varying in intensity in accordance with the effect of said field on the magnetization of said body, a third winding arranged on said body, a second rectifier having its input terminals connected in said alternating current circuit and its output terminals connected with said third winding, means disposed between said second rectifier and said third winding for adjusting the active working range of the magnetization curve of said body, and a measuring instrument associated with said arrangement so as to be actuated in accordance with said effect of said field.

7. A device for determining the magnitudes of a unidirectional magnetic field, for instance the magnetic earth field, comprising an elongated body of magnetically highly permeable material to be exposed to said field so as to be magnetized by a unidirectional force caused by said field, circuit connections electromagnetically coupled with said body for producing in said body a periodically variable magnetization and for causing an electric magnitude to vary responsive to the effect of said unidirectional force on said magnetization, a sensitive measuring instrument arranged in said circuit connections for indicating the variation of said magnitude, and a compensating circuit connected with said instrument for compensating the circulating current with respect to said instrument.

8. A device for determining the magnitudes of a weak magnetic field, for instance the magnetic earth field, comprising an elongated body of magnetically highly permeable material to be exposed to said field, circuit connections electromagnetically coupled with said body for producing in said body a periodically variable magnetization and for causing an electric magnitude to vary responsive to the effect of said field on said magnetization, means for producing an additional direct current magnetization of said body, said means being connected with said circuit connections, a rectifier disposed between said circuit connections and said means so as to cause said additional magnetization to vary in accordance with said electric magnitude, and a measuring instrument connected with said means for indicating the variations of said electric magnitude.

9. An arrangement for determining the magnitudes of a unidirectional magnetic field, comprising a body of magnetically highly permeable material to be exposed to said field so as to be magnetized by a unidirectional force caused by said field, a winding arranged on said body, circuit means connected with said winding and including a periodically variable current source for producing a periodically variable magnetization of said body, a second magnetizing winding arranged on said body, a rectifier connected between said first and said second winding so as to energize said second winding by a direct current varying in dependence upon the effect of said field on the magnetization of said body, and a measuring circuit connected with one of said windings for indicating said effect.

10. A device for determining the magnitudes of a unidirectional magnetic field such as the earth field, comprising an elongated body of magnetically highly permeable material to be exposed to said field so as to be magnetized by a unidirectional force caused by said field, a primary winding disposed on said body, energizing circuit means connected with said primary winding and including a current source of periodically variable intensity, said winding and said circuit means being designed for producing in said body a magnetization substantially in a working range where a change of said unidirectional force causes a corresponding change of the magnetization, a secondary winding disposed on said body so as to vary its inductance in dependence upon said change of the magnetization, a balanceable measuring circuit connected with said secondary winding so as to have its balance condition dependent upon said inductance variations of said secondary winding, and a measuring instrument arranged in said measuring circuit for indicating said variations as a measure of the magnitude to be determined.

11. A device for determining the magnitudes of a unidirectional magnetic field, for instance the magnetic earth field, comprising an elongated body of magnetically highly permeable material to be exposed to said field so as to be magnetized by a unidirectional force caused by said field, circuit means electromagnetically coupled with said body and including periodically variable current supply means for producing in said body a variable magnetization substantially within a flux range where a change of said unidirectional force causes a corresponding change of the flux of said body, said circuit means forming an oscillatory system having one of its elements dependent as to magnitude on said flux so as to vary a determinant of the oscillations of said system in response to said change of the flux, and measuring means associated with said circuit means for indicating the variation of said determinant.

GUSTAV BARTH.